US006442619B1

(12) United States Patent
Ouellette (10) Patent No.: US 6,442,619 B1
(45) Date of Patent: Aug. 27, 2002

(54) SOFTWARE ARCHITECTURE FOR MESSAGE PROCESSING IN A DISTRIBUTED ARCHITECTURE COMPUTING SYSTEM

(75) Inventor: Christopher J. Ouellette, McKinney, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/001,377

(22) Filed: Dec. 31, 1997

(51) Int. Cl.$^7$ .................................................. G06F 9/00
(52) U.S. Cl. ........................................ 709/316; 709/315
(58) Field of Search ................................ 709/300, 303, 709/316, 315

(56) References Cited

U.S. PATENT DOCUMENTS

| 5,095,522 A | * 3/1992 | Fujita et al. ................. 709/316 |
| 5,590,334 A | * 12/1996 | Saulpaugh et al. ......... 709/206 |
| 5,678,007 A | * 10/1997 | Hurvig ........................ 709/227 |
| 6,018,805 A | * 1/2000 | Ma et al. ..................... 709/230 |
| 6,345,316 B1 | * 2/2002 | Chessell et al. ............ 709/101 |

FOREIGN PATENT DOCUMENTS

| JP | 402151952 A | * 6/1990 | ........... G06F/13/00 |
| WO | 9722928 | 6/1997 | .............. G06F/9/46 |

OTHER PUBLICATIONS

Microsoft. "The Component Object Model Specification". Chapter 13, pp. 164–190. Mar. 6, 1995.*
Microsoft. "The Component Object Model Specification". Chapter 13, Component Object Model Network Protocol. p. 164–190, Mar. 1995.*
(Microsoft) Microsoft. "The Component Object Model Specification", Mar. 6, 1995.*
(Fang) Fang, F.W. et al. "The visual modeling technique: An introduction and overview", Aug. 1996.*
(Orfali) Orfali, Robert. "Client/Server Survival Guide with OS/2", 1994.*
B. Wismans, "Datenbankanbindung an das Internet: Aktueller Stand und zukünftige Entwicklung", Mobis '97: Distributed Objects in Organisation, vol. 4, No. 1, Oct. 16–17, 1997, pp. 72–77.
Author Unknown, "Object –Oriented Message Queue", IBM Technical Disclosure Bulletin, vol. 36, No. 6A, Jun. 1, 1993, pp. 585–586.
PCT Search Report, dated Jun. 4, 1999.

* cited by examiner

Primary Examiner—St. John Courtenay, III
Assistant Examiner—Lewis A. Bullock, Jr.

(57) ABSTRACT

A distributed architecture computing system includes one or more processors and object-oriented control program for processing request-type and response-type messages provided by a messaging service. The request-type messages are associated with one or more newly requested operations, and the response-type messages are associated with previously requested operations. The control program for the distributed architecture computing system includes a common server object for receiving and processing the request-type and response-type messages, and a specialized factory object for receiving the request-type messages from the common server object and creating a specialized request object for processing each of the request-type messages. Each of the request objects includes process request and process response methods for performing the requested operation, maintaining state information associated with the requested operation and generating the response-type messages. In addition, the control program includes a receive mailbox object associated with the common server object for accessing the request-type and response-type messages bound for the common server object, a send mailbox object associated with the common factory object for sending the response-type messages to the receive mailbox object, and a message object for buffering message data included in the request-type and response-type messages.

16 Claims, 10 Drawing Sheets

FIG. 12

SOFTWARE ARCHITECTURE FOR MESSAGE PROCESSING IN A DISTRIBUTED ARCHITECTURE COMPUTING SYSTEM

TECHNICAL FIELD OF THE INVENTION

This invention is related in general to the field of computing systems. More particularly, the invention relates to a software architecture for message processing in a distributed architecture computing system.

BACKGROUND OF THE INVENTION

Distributed computing systems require a variety of software and hardware components for performing processing, signaling, remote database query, administrative and other tasks. These components must be a capable of communicating with other components of the distributed architecture computing system across one or more interfaces.

Conventional computing systems use a variety of techniques to communicate information between the various components of the system. In client/server systems, for example, it is not uncommon to have individually dedicated server processes for communicating instructions and information back and forth from system controllers to lower level system components. These server processes typically receive messages and perform highly specialized operations based on information contained in the received messages. Consequently, multiple message processing is severely impaired in conventional distributed architecture computing systems unless the server process provides some mechanism for processing messages in parallel, i.e. more than one request active at a time.

SUMMARY OF THE INVENTION

Therefore, it is a primary object of the present invention to provide a common method and software architecture for receiving request messages, matching response messages to the corresponding request messages waiting for a response, and maintaining a list of active requests. According to an aspect of the present invention, the method for message processing is independent of the specific messages to be processed by the corresponding message server. The software architecture for message processing can be implemented, for example, in a distributed telecommunication switching system.

It is another object of the present invention to provide a software architecture for message processing in a distributed architecture computing system wherein the support for parallel message processing is common for all types of message servers.

It is yet another object of the present invention to provide a software architecture and method for message processing in a distributed architecture computing system wherein software objects, instead of functions, are used to process message data and perform requested operations. In a distributed telecommunication switching system, for example, a switch statement can be used to construct objects that process message data and execute the necessary switching operations.

It is still another object of the present invention to provide a software architecture for message processing in a distributed architecture computing system wherein specialized functionality does not appear in the server objects, but is instead distributed at lower levels of the software hierarchy.

It is still another object of the present invention to provide a software architecture for message processing in a distributed architecture computing system whereby a server object creates a factory object which defines request objects for performing operations requested in messages received by the server object.

It is still another object of the present invention to provide a software architecture for message processing in a distributed architecture computing system whereby control of message processing is returned to a server object after creation of the factory and request objects such that the server object is capable of processing subsequent messages.

Further objects, features and advantages of the invention will become apparent from the following detailed description taken in conjunction with the accompanying figures showing illustrative embodiments of the invention.

In accordance with a preferred embodiment of the present invention, a distributed architecture computing system is provided that includes one or more processors and an object-oriented control program for processing request-type and response-type messages provided by a messaging service. The request-type messages are associated with one or more newly requested operations, and the response-type messages are associated with previously requested operations. The control program for the computing system includes: a common server object for receiving and processing the request-type and response-type messages; a common factory object for receiving the request-type messages from the common server object and creating a common request object for processing each of the request-type messages, each of the request objects include process request and process response methods for performing the requested operation, maintaining state information associated with the requested operation and generating the response-type messages; a receive mailbox object associated with the common server object for accessing the request-type and response-type messages bound for the common server object; a send mailbox object associated with the common factory object for sending the response-type messages to the receive mailbox object; and a message object for buffering message data included in the request-type and response-type messages.

In accordance with another preferred embodiment of the present invention, a distributed telecommunications switching system is provided that includes one or more processors and an object-oriented control program for processing request-type and response-type messages provided by a messaging service. The request-type messages are associated with one or more newly requested operations, and the response-type messages are associated with previously requested operations. The control program for the computing system includes: a common server object for receiving and processing the request-type and response-type messages; a common factory object for receiving the request-type messages from the common server object and creating a common request object for processing each of the request-type messages, each of the request objects including process request and process response methods for performing the requested operation, maintaining state information associated with the requested operation and generating the response-type messages; a receive mailbox object associated with the common server object for accessing the request-type and response-type messages bound for the common server object; a send mailbox object associated with the common factory object for sending the response-type messages to the receive mailbox object; and a message object for buffering message data included in the request-type and response-type messages.

In accordance with another aspect of the present invention, a distributed architecture computing system is provided wherein request-type messages associated with requested operations are received by a common server object and forwarded to a factory object for processing by request objects. The system includes a method wherein the common server object provides the request-type messages to the factory object, and the factory object creates the request objects for processing the request-type messages such that one of the request objects corresponds to one of the request-type messages. For each of the request-type messages, the corresponding request object is returned by the factory object to the common server object, which then invokes a process request method associated with the returned request object. A method is also provided when the common server object receives a response-type message and is used for matching the response-type message to the corresponding request object waiting for a response. The common server object invokes the request object's process response method which completes the processing of the response-type message.

In accordance with another aspect of the present invention, a distributed telecommunications switching system is provided wherein request-type messages associated with requested operations are received by a common server object and forwarded to a factory object for processing by request objects. The system includes a method wherein the common server object provides the request-type messages to the factory object, and the factory object creates the request objects for processing the request-type messages such that one of the request objects corresponds to one of the request-type messages. For each of the request-type messages, the corresponding request object is returned by the factory object to the common server object, which then invokes a process request method associated with the returned request object. A method is also provided when the common server object receives a response-type message and is used for matching the response-type message to the corresponding request object waiting for a response. The common server object invokes the request object's process response method which completes the processing of the response-type message.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
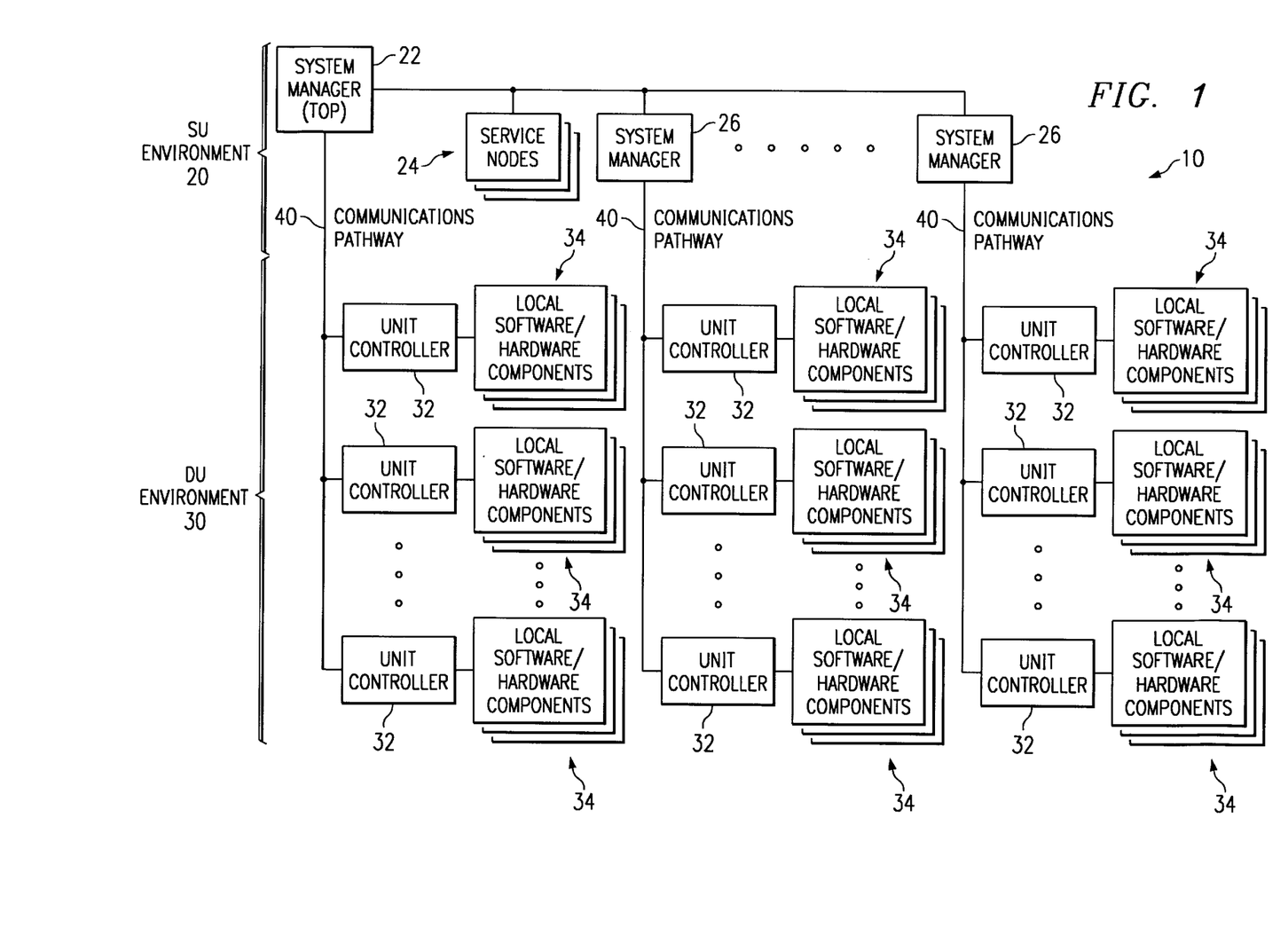
FIG. 1 shows a block diagram of a distributed architecture computing system utilizing a method for message processing according to a preferred embodiment of the present invention.

FIG. 1 is a block diagram of a computing system 10 utilizing a method for initializing computing tasks according to a preferred embodiment of the present invention. As shown in FIG. 1, computing system 10 includes a service unit layer 20 for top-level management and control of computing system 10, a delivery unit layer 30 for communication and control of software elements and hardware components, and a communications pathway 40 for connecting service unit layer subsystems with delivery unit layer subsystems. Service unit layer 20 includes a top-level system manager 22, one or more service nodes 24 connected to top-level system manager 22, and one or more system managers 26 also connected to top-level system manager 22. Delivery unit layer 30, under the control of service unit layer 20, includes one or more unit controllers 32 connected to top-level system manager 22 or system managers 24 via communications pathway 40, and a plurality of software elements, or "building blocks" 34, designed to be controlled by unit controllers 32, for performing specific computing tasks and operations.

Computing system 10 of FIG. 1 may also include industry standard operating systems, object-oriented implementation, location transparent interfaces such as the Common Object Request Broker Architecture ("CORBA"), name-based messaging services, and graphical user interfaces ("GUI's") for system management and control. In addition, computing system 10 can be configured to operate as a telecommunications switching system such as the one disclosed in U.S. Pat. No. 5,495,484, issued Feb. 27, 1996, which is hereby incorporated by reference.

In a distributed telecommunications switching system implementation of FIG. 1, for example, service unit layer 20 of FIG. 1 provides the functionality of the switching system not inherently dependent upon the technology and interfaces required for connecting end-users to a public telephony network. By contrast, delivery unit layer 30 provides the functionality of the switching system directly associated with the technology and interfaces required for connecting end-users to a public telephony network. Subsystems and components included in service unit and delivery unit layers 20 and 30 are separately functioning subsystems which can be deployed, upgraded and maintained independently from each other, thus allowing new technologies and enhancements to be easily integrated into an existing switching system. The various service unit and delivery unit subsystems may be geographically co-located or disbursed while maintaining the distributed characteristics of the functions performed by the overall switching system.

Delivery unit layer 30 of computing system 10 of FIG. 1 includes hardware components, such as specialized application cards and processors, for providing specific telecommunication switching services. For example, in the above-mentioned distributed telecommunications switching implementation of FIG. 1, delivery unit layer 30 is designed to deliver one or more communication services to end-users on a public telephony network. The delivery unit hardware components may be constructed and arranged to perform a variety of computing tasks including but not limited to configuration management, fault management, performance management, call processing and port management tasks.

Figure 2:
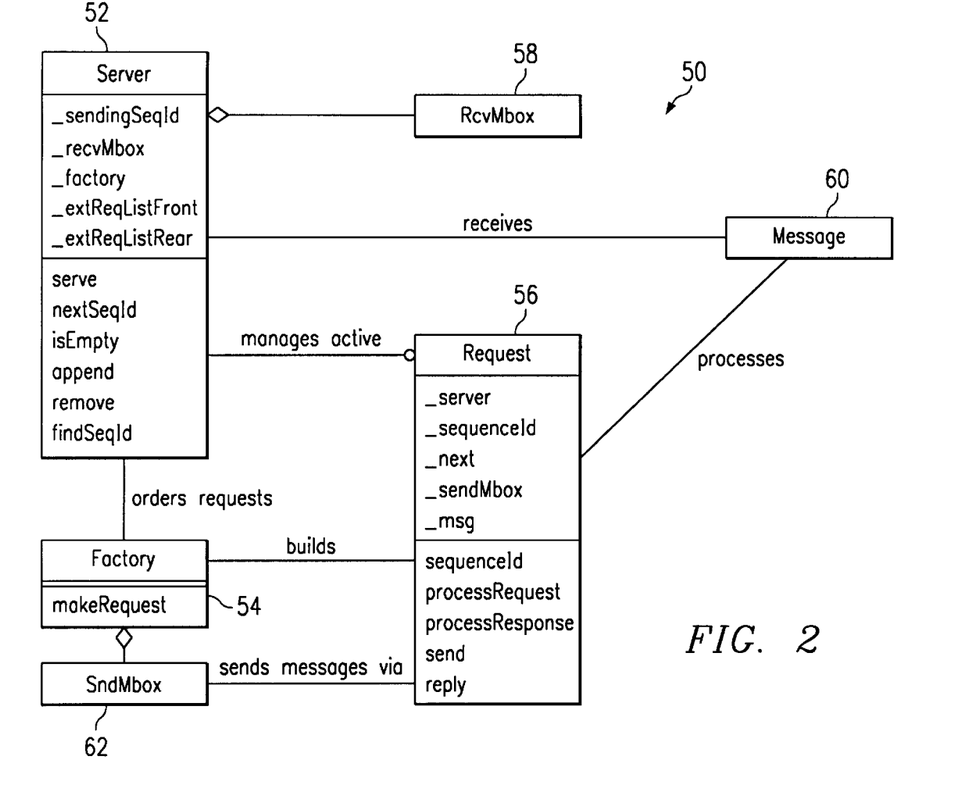
FIG. 2 shows an object model defining the software architecture (building block infrastructure) for message processing in a distributed architecture computing system.

FIG. 2 shows an object model 50 defining a software architecture, i.e., server infrastructure, for message processing in a distributed architecture computing system according to a preferred embodiment of the present invention. The object model includes a server object class 52, a factory object class 54, a request object class 56, a receive mailbox object class 58, a message object class 60 and a send mailbox object class 62.

According to a preferred embodiment of the object model 50, each instance of the server object class 52 is responsible for receiving all incoming messages from other software applications. These messages are request-type messages for requesting specialized tasks or operations, or response-type messages for responding to previously issued requests. Both request-type and response-type messages contain header information including, by way of example and not limitation, a message type indicator, an operation type indicator, a sequence identifier and an error code indicator. The sequence identifier, which is unique to the sender of the request-type message, is used by the sender of the request-type message to match a response-type message to the original request.

Figure 3:
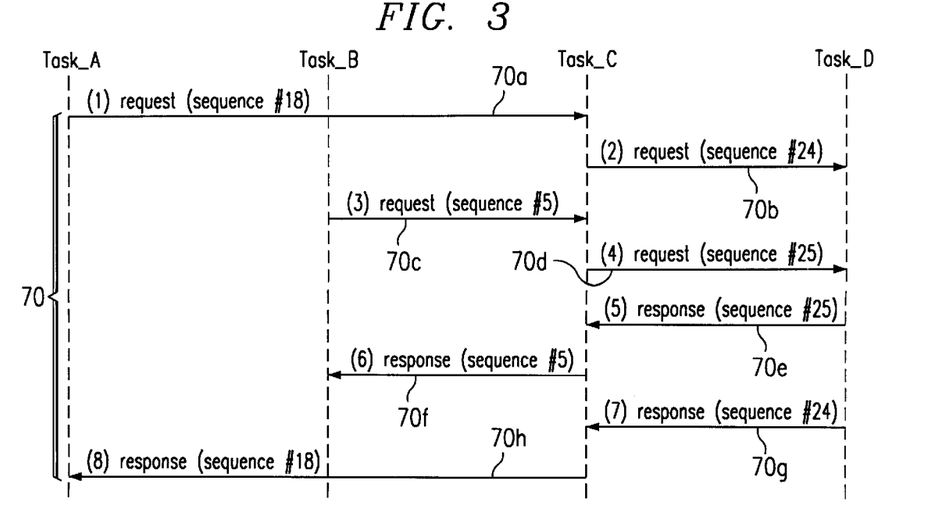
FIG. 3 shows an event trace for a sample sequence of request-type and response-type messages.

FIG. 3 shows an example of how the sequence identifier is used. The figure shows an event trace for a sample sequence 70 of incoming and outgoing request-type and response-type messages. The sample sequence 70 includes message transport between a plurality of tasks or objects A through D. As shown in FIG. 3, Task A requests a first operation from Task C by sending a first request-type message with sequence #18 to Task C (Event 70a). Task C then sends a second request-type message with sequence #24 to Task D as part of processing the first operation originally requested by Task A (Event 70b). Task B then requests a second operation from Task C by sending a third request-type message with sequence #5 to Task C (Event 70c). Task C then sends a fourth request-type message with sequence #25 to Task D as part of processing the second operation originally requested by Task B (Event 70d).

The sequence numbers 18, 24, 5 and 25 are then used to match the response-type messages with the corresponding request-type messages sent by Tasks A, B and C in Events 70a through 70d. As further shown in FIG. 3, Task C receives a first response-type message from Task D and uses sequence #25 in the first response-type message to match this response with the request-type message previously sent by Task C to Task D (Event 70e). Task B then receives a second response-type message from Task C and uses sequence #5 in the second response-type message to match this response with the request-type message previously sent by Task B to Task C (Event 70f). Similarly, Task C receives a third response-type message from Task D and uses sequence #24 in the third response-type message to match this response with the request-type message previously sent by Task C to Task D (Event 70g). Task A then receives a fourth response-type message from Task C and uses sequence #18 in the fourth response-type message to match up this response with the request-type message previously sent by Task A to Task C (Event 70h).

The processing of response-type messages, as shown by Events 70e through 70h of FIG. 3, utilizes an active request list created and maintained by the server object. The active request list registers and tracks active request objects awaiting responses from other objects. The active request objects are those objects which have been created as a result of the server receiving a request-type message. The server object searches the active request list to match a response-type message to the corresponding active request object. Active request objects are therefore required to save in their private member data the sequence identifier for any request messages they originate. When a response-type message is received, the server object 52 uses the sequence identifier from the response-type message to match the sequence identifier saved in the request object private member data.

Referring again to FIG. 2, the software architecture of the present invention further includes a messaging service (not shown) and a server object class 52 for receiving and processing messages from instances of the receive mailbox object class 58. The server object class 52 is a an abstract base class for any specialized server object class, and contains a receive mailbox object.

Each instance of server object class 52 contains the server processing loop, and has a pointer to the start of the active request list. Each server object derived from the server object class 52 also has the member functions used by the request objects to manipulate the active request list. Each server object "orders" a request object via the factory object class 54 whenever a request-type message is received, and maintains the list of "active" request objects. In addition, each server object may be associated with many instances of the request object class 56 depending upon the operations supported by the server object. A server object class 52 is therefore capable of actively managing all associated instances of the request object class 56.

According to a preferred embodiment of the present invention, the server object class 52 includes the attributes, member data and methods required for processing sequence identifiers and active request lists, allocating and reading the receive mailbox objects, and creating the factory objects used to construct the required request objects.

The factory object class 54 of FIG. 2 is an abstract base class for any specialized factory object class. Each instance of the factory object class 54 provides the method for constructing the appropriate request objects based on the requested operation in the received request-type messages. When a request-type message is forwarded from a server object to a factory object, the factory object processes the message and determines the operation type associated with the message. Based on the particular operation requested, the factory object constructs the appropriate request object corresponding to the requested operation. Each factory object is also associated with a send mailbox object which is used by the request objects for sending messages.

The request object class 56 is an abstract base class for any specialized request object class. Each instance of the request object class 56 is responsible for adding itself to the active request list when it is created, and for removing itself from the active request list when the associated operation is completed. Each request object also has a pointer to the original request-type message that caused the request object to come into existence, and a pointer to the send mailbox object provided by the corresponding factory object that the request object uses for sending any new request-type messages or for replying to the original request-type message. Each request object saves the sequence identifier of any request-type message that the request originates such that the server object can match the response-type message with the corresponding request object. The request object class 56 provides methods to retrieve the requests, sequence identifier, send messages and default reply, process request and process response methods.

Request objects derived from the request object class 56 are also designed to implement a variety of processing methods including but not limited to a process request method, a process response method, and a reply method. The sequence identifier method is used to save the sequence identifiers associated with each request-type message. The process request method is used for actually performing the requested operation, and the process response method is used for processing any response-type messages the request object may receive. The reply method is used for sending a response-type message to the original request-type message, and the send method is used for sending any request-type messages the request object originates.

Note, if the request object does not expect to ever receive any response-type messages, then the process response method does not need to be implemented. In such a case a default process response method will take care of processing an error if an unexpected response is received.

After a factory object constructs the appropriate request object based on the operation requested in the received request-type message, the factory object returns the request object to the server object. The server object invokes the request object's process request method, which contains the instructions required for processing the original request received by the server object. The process request method must save any state information pertaining to the processing of the request operations. If processing the request-type message requires that a message be sent to other server objects, then the request object is also responsible for maintaining the state information and processing any responses from the other server objects.

Referring again to FIG. 2, if a server object derived from the server object class 52 retrieves a response-type message from the corresponding receive mailbox object, the server object matches the sequence identifier of the received response-type message with the corresponding sequence identifier on the active request list maintained by the server object. After the response message is matched with the corresponding request object on the active request list, the server object calls the process response method of that request object, which contains the instructions required for processing the response.

In the case where the server object receives a request-type message for an operation that the factory object does not understand, the factory object causes an "unknown request" request object to be returned to the server object. The "unknown request" process request method contains the instructions for processing unknown request-type message. Similarly, in the case where the server object receives a response-type message and the server object is unable to match the response-type message with a request object on the active request list, then an "unknown request" object is also created and returned back to the server object, which then invokes an associated "unknown request" process response method.

Referring again to FIG. 2, the software architecture of the present invention also includes the receive mailbox object class 58 for reading incoming messages from the messaging service. The messaging service can be any messaging service suitable for real-time data communications. Instances of the receive mailbox object class 58 provide methods for reading and de-allocating messages provided by the messaging service.

The send mailbox object class 62 is used for sending messages. The class provides methods for allocating and de-allocating messages, sending messages, and replying to previously received messages. In addition, the message object class 60 is used to contain request-type and response-type messages. Each instance of the message object class 60 includes a data buffer of a predefined, configurable size for writing or reading message data.

The software architecture as shown in FIG. 2 is advantageous in that message processing is transparent to the server object. Each server object is designed such that the specialized processing required for each operation the server supports is delegated to the specialized request objects. Consequently, the software architecture of the present invention features a "common" server object that is independent of the specialized processing to be performed. Specialized functionality is designed away from the server object class 52 and instead designed into the specialized factory and request classes derived from the common factory and request classes 54 and 56, respectfully.

According to a preferred embodiment of the present invention, the factory objects derived from the factory object class 54 are specialized and designed based upon the message types received and operations to be performed. The request objects derived from the request class 56 are also specialized in that they contain the methods required to process the different requested operations.

Figure 4:
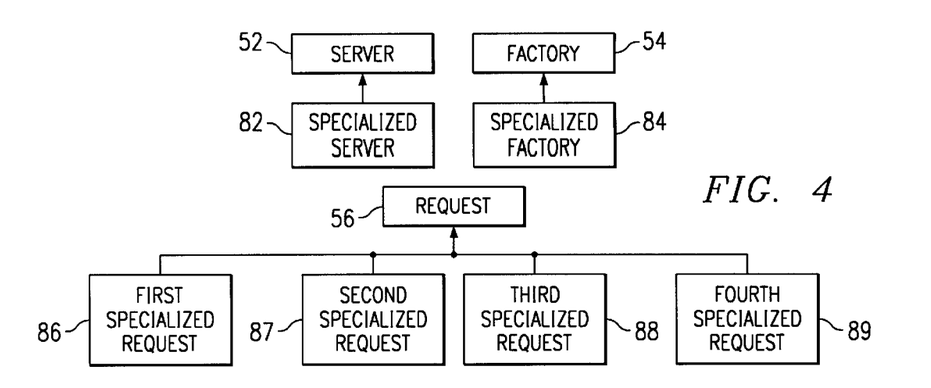
FIG. 4 shows an inheritance diagram corresponding to the object model of FIG. 2.

FIG. 4 is an inheritance diagram 80 that shows how the server infrastructure of FIG. 2 is specialized to perform specific operations or processing. As shown in FIG. 4, the specialized server includes a specialized server class 82 derived from, or "inherited off," the common server object class 52, a specialized factory object class 84 inherited off the common factory object class 54, and one or more specialized request object classes 86 through 89 inherited off the common request object class 56. Each specialized request class corresponds to a specific operation supported by the server. The server infrastructure of FIG. 2 can be specialized or customized, for example, to perform specific tasks associated with one or more application cards of the distributed architecture computing system 10 of FIG. 1.

Figure 5:
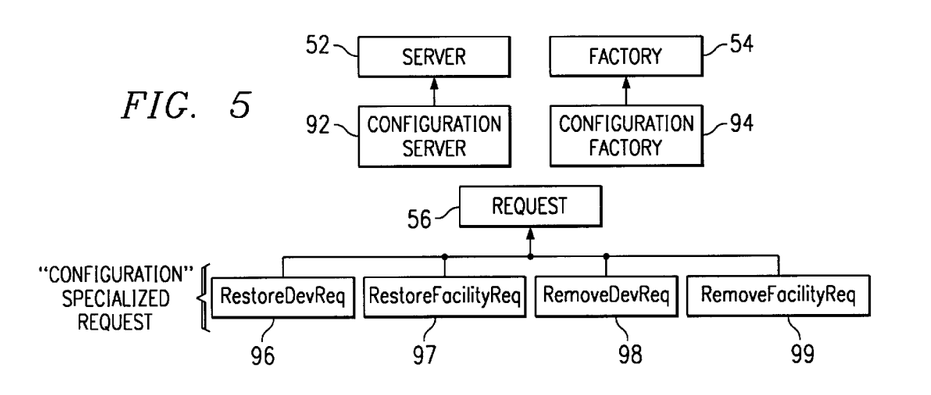
FIG. 5 shows a specialized server object class for use in a distributed telecommunications switching system implementation of FIG. 1.

FIG. 5 shows a specialized server to handle configuration operations for use in the distributed telecommunications switching implementation of the distributed architecture computing system 10 of FIG. 1. The configuration server shown in FIG. 5 consists of a configuration server 92 class, configuration factory class 94 and several request classes 96 trough 99. The configuration server class 92, configuration factory class 94 and request classes 92 through 99 are inherited off the "common" server class 52, the factory class 54 and the request class 56, and are characterized by the application card being operated and the operations being performed. The specialized request classes 96 through 99 represent unique operations corresponding to the tasks, i.e., configuration management, to be performed by a particular application card. The specialized request object classes 96 through 99 contain all of the instructions required to perform the requested operation, including any state information pertaining to the processing of the requested operations.

To further illustrate server specialization, the configuration server of FIG. 5 is required to perform configuration management operations associated with application card type A. As shown in FIG. 5, a specialized configuration server class 92 is derived from the server class 52, and a specialized configuration factory class 94 is derived from the factory class 54 to construct the required configuration request classes 96 through 99. The specialized configuration request classes 96 through 99 are derived from the request class 56 to perform specific configuration management operations associated with application card A. These operations may include, for example, restore device, restore facility, remove device and remove facility configuration operations.

Similarly, a specialized server can be customized to perform other tasks, such as fault management, test management, performance management, call processing and port management operations, for the same or other types of application cards. For example, if test management operations are required for application card type B, specialized "Test" server, factory and request object classes 92 through 99 are derived from the common server, factory and request object classes 52, 54 and 56, respectively, to perform the required test tasks for the application card B.

Figure 6A:
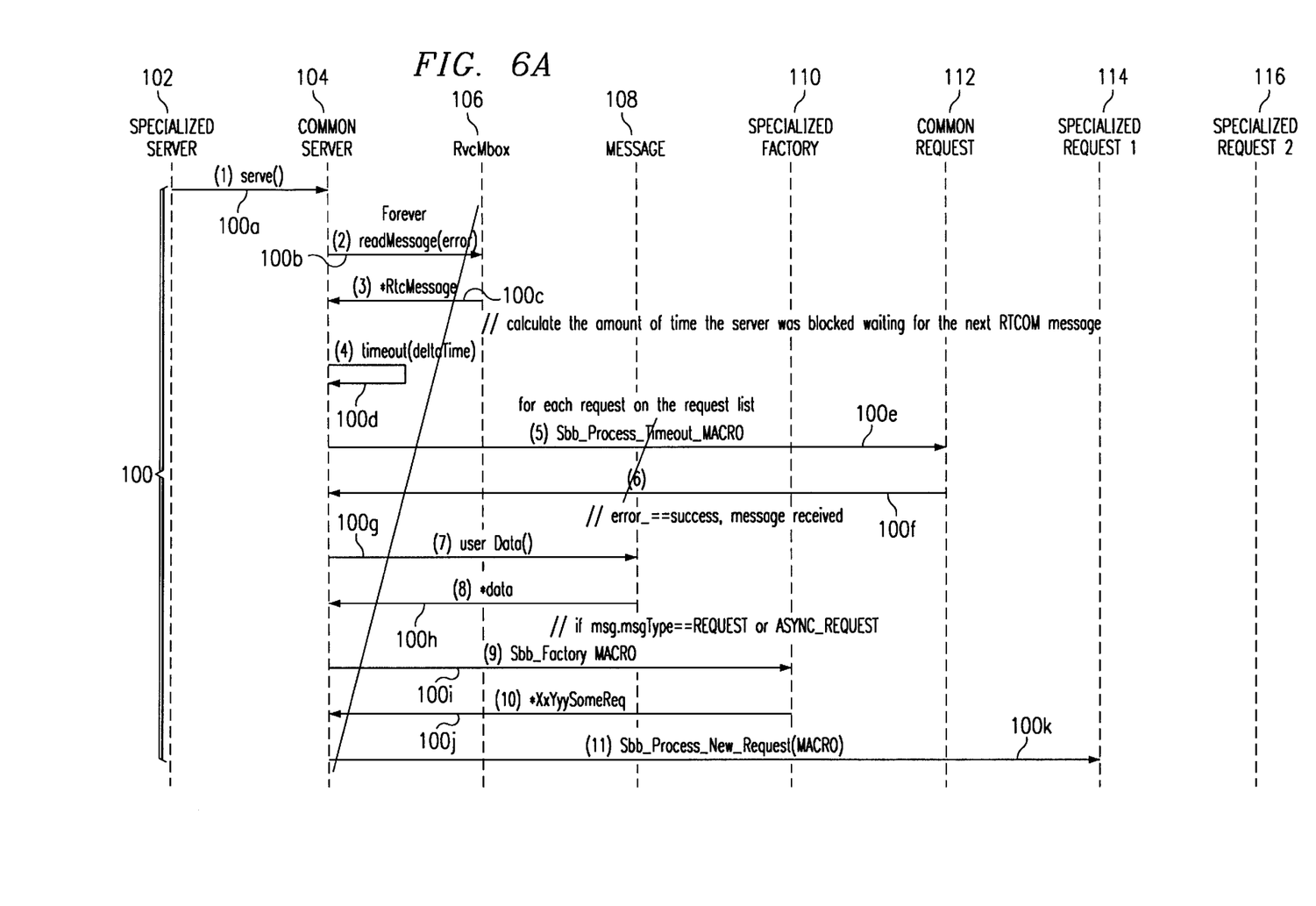
FIGS. 6A and 6B show an event trace corresponding to a sequence for processing incoming messages and timeouts.
Figure 6B:
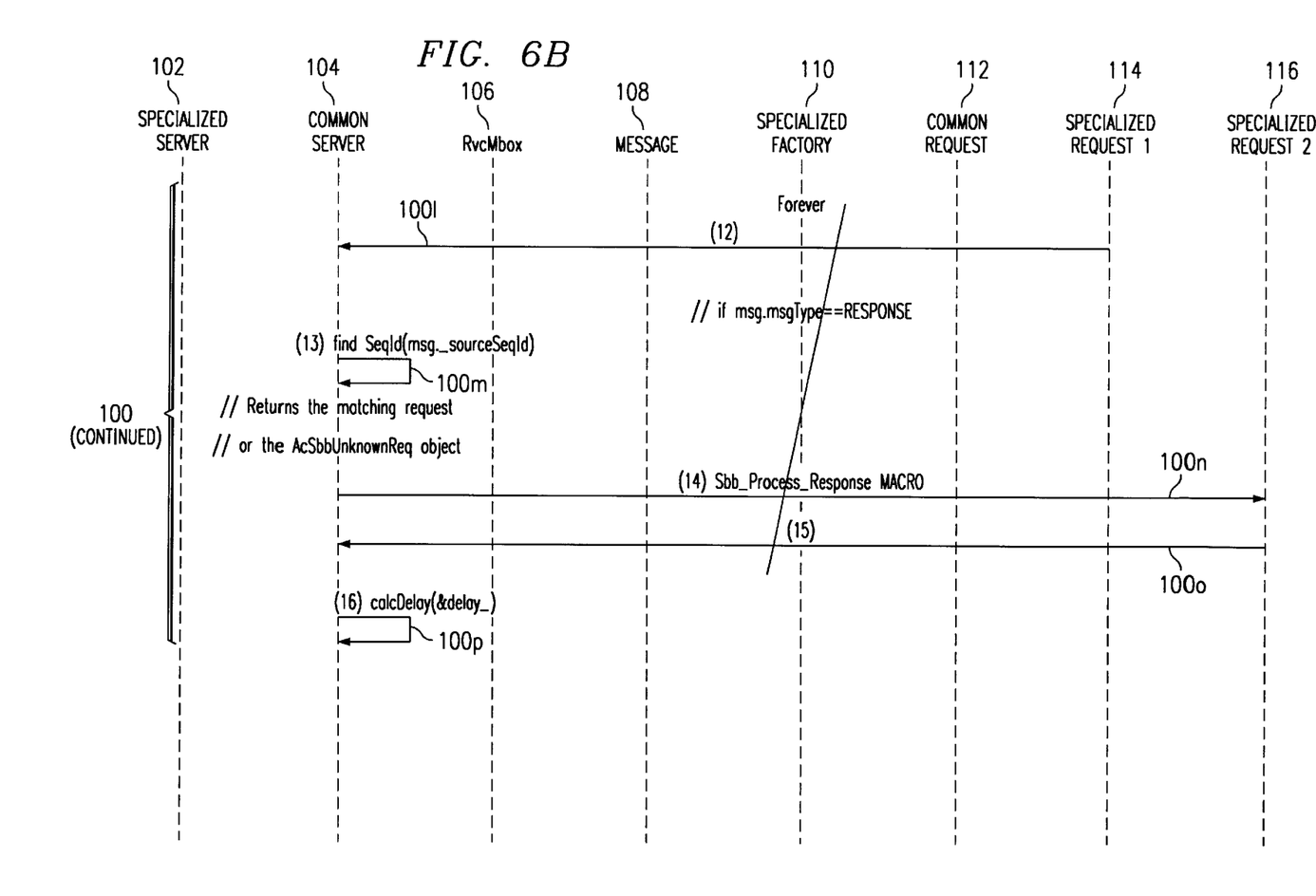

FIGS. 6A and 6B show an event trace corresponding to a sequence 100 for processing incoming messages and timeouts by a server object according to a preferred embodiment of the present invention. Basic server object processing includes adjusting timers associated with the request objects on the server object's active request list, processing timeouts associated with the request objects on the server object's active request list, processing new request-type or response-type messages, and calculating delay periods for receiving subsequent messages based on the timer values of the request objects on the server's active request list. As shown in further detail by FIGS. 6A and 6B, server object processing includes Events 100a through 100p which are repeated as part of an infinite loop by an instance of the common server object class 104.

According to a preferred embodiment of the present invention, an instance of a specialized server class 102 is derived from the common server class 104 and entered into the common server processing loop (Event 100a). An instance of the common server maintains an active request list representing previously created requests awaiting a response. The common server object reads the next message from an instance of the receive mailbox class 106 associated with the common server object (Event 100b), and returns to the common server object a pointer to the received message along with an error variable, if applicable, to indicate the result of the read (Event 100c). The common server object then adjusts the timeout periods associated with all specialized request objects on the common server object's active request list based on the amount of time the common server object was blocked waiting for the next incoming message (Event 100d).

Figure 7:
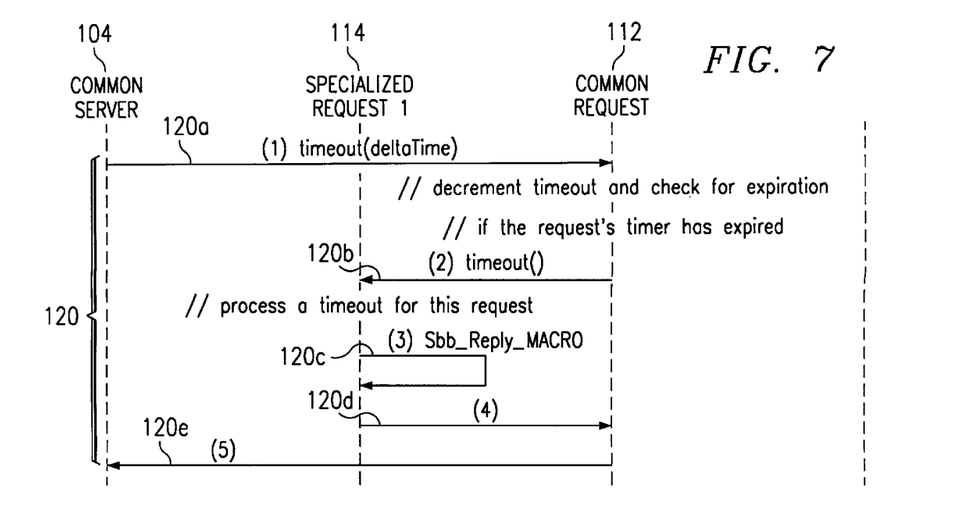
FIG. 7 is an event trace corresponding to a process timeout sequence used by a request object while waiting for a response-type message according to the event trace of FIGS. 6A and 6B.
Figure 8:
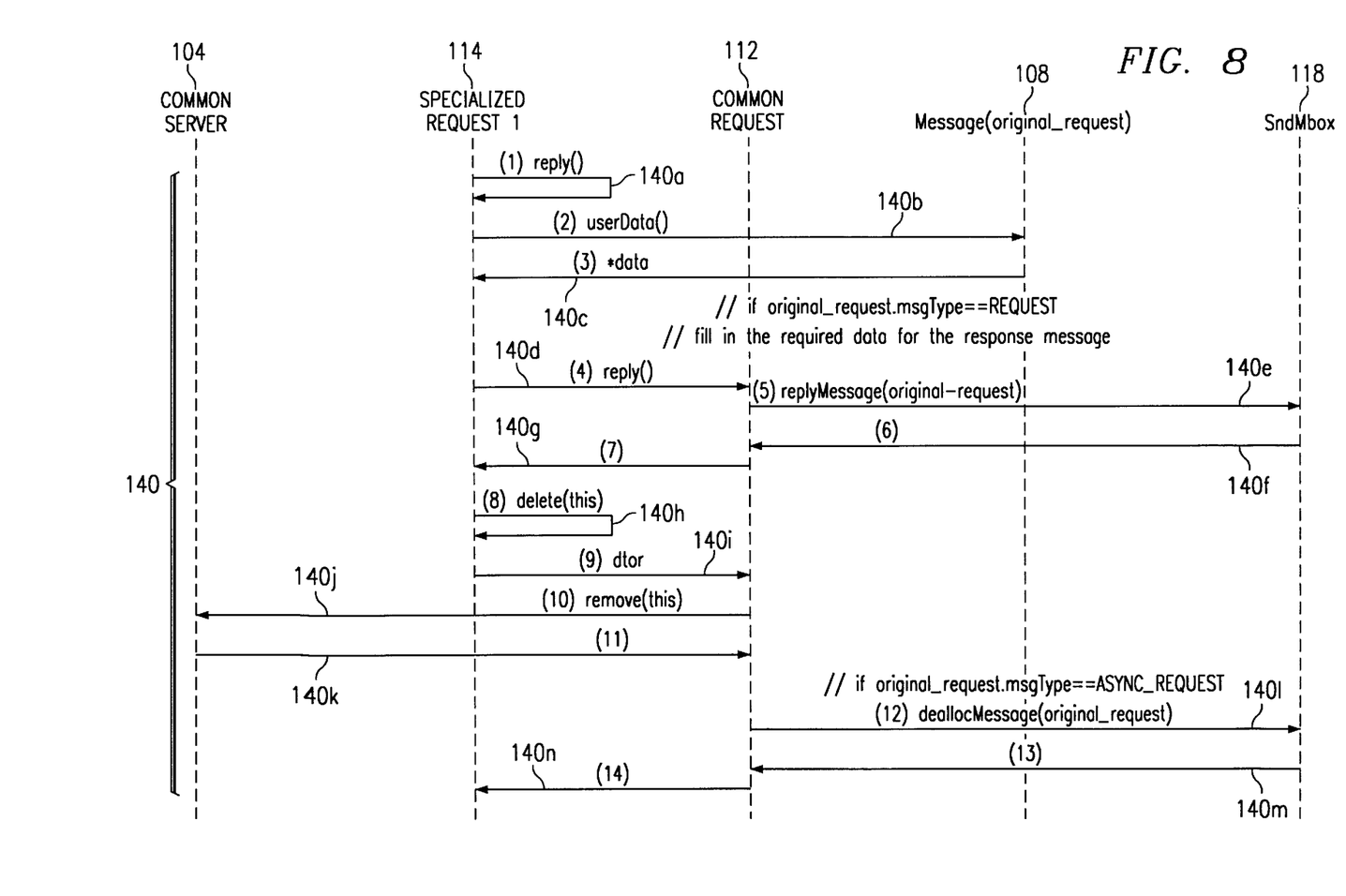
FIG. 8 is an event trace corresponding to sequence for replying to a request-type message used by the process timeout sequence of FIG. 7, an initial processing sequence as shown in FIG. 10, and a process response sequence as shown in FIG. 12.

Next, as shown by Events 100e and 100f, each specialized request object on the common server object's active request list executes a process timeout sequence 120 as shown by the event trace of FIG. 7. The process timeout sequence 120 of FIG. 7, together with a reply sequence 140 as shown in FIG. 8, allows each active request object to determine whether a timeout has occurred while waiting for a response message.

Figure 9:
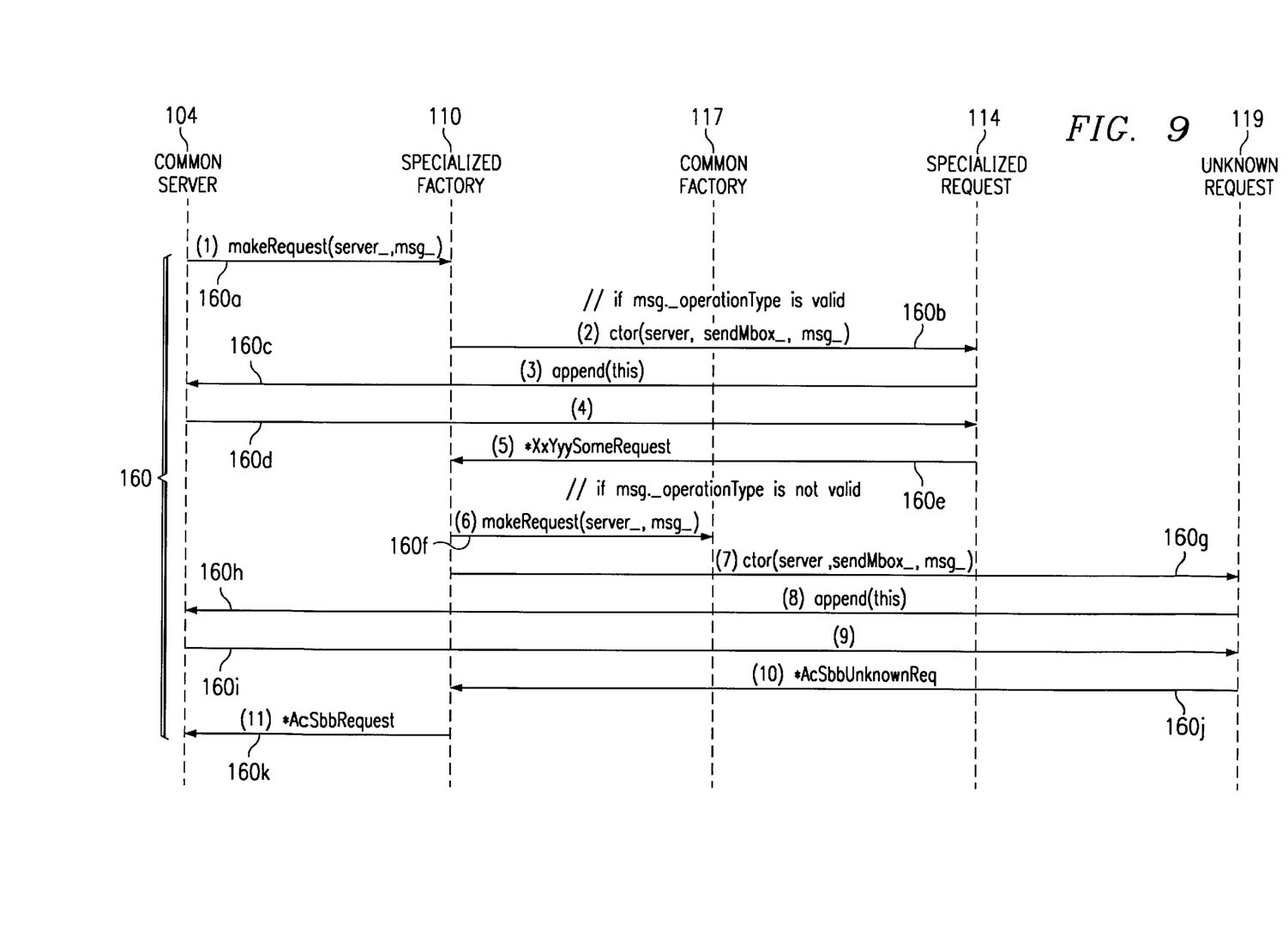
FIG. 9 is an event trace corresponding to a sequence for creating a new specialized request object according to the event trace of FIGS. 6A and 6B.
Figure 10:
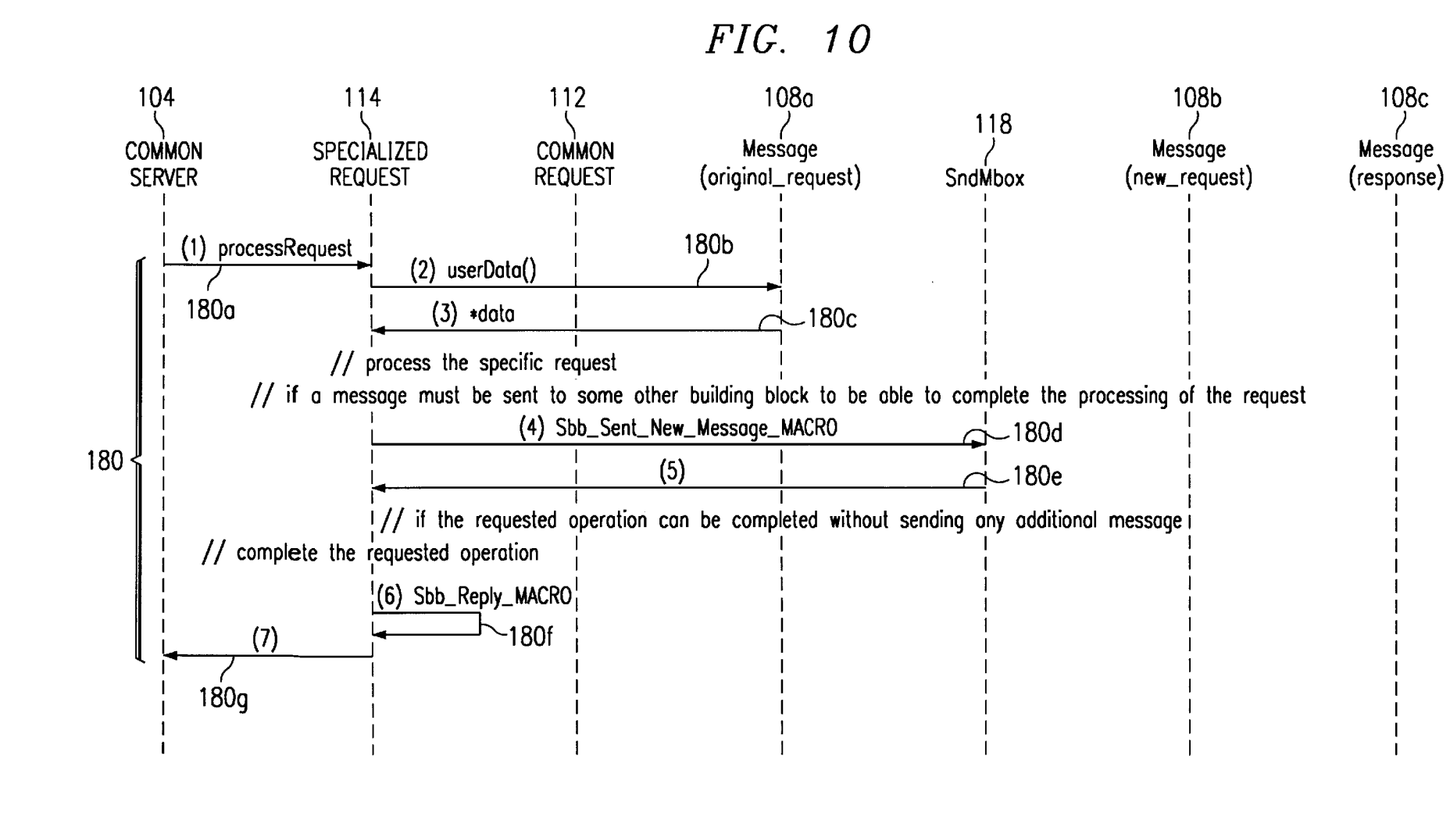
FIG. 10 is an event trace corresponding to a sequence for processing a request-type message by a newly created specialized request object according to the event trace of FIGS. 6A and 6B.

The remaining events 100g through 100p of the common server object processing event sequence 100 of FIGS. 6A and 6B are the events that occur if a valid message is received and no timeout is detected. As part of further server object processing, the common server object acquires a pointer to the start of the message data contained in the received message from the message object (Event 100g), which then returns the pointer back to the common server object such that the common server object may determine whether the received message is a request-type or response-type message (Event 100h). If the common server object determines that the received message is a request-type message, the event sequence 160 as shown in FIG. 9 is executed by the an instance of the specialized factory object class 110 to create a new specialized request object (Event 100i). A pointer to the request object responsible for processing the message received is then returned to the common server object from the specialized factory object (Event 100j), and an event sequence 180 as shown in FIG. 10 is executed for initial processing of the newly created request object (Events 100k and 100l).

Figure 12:
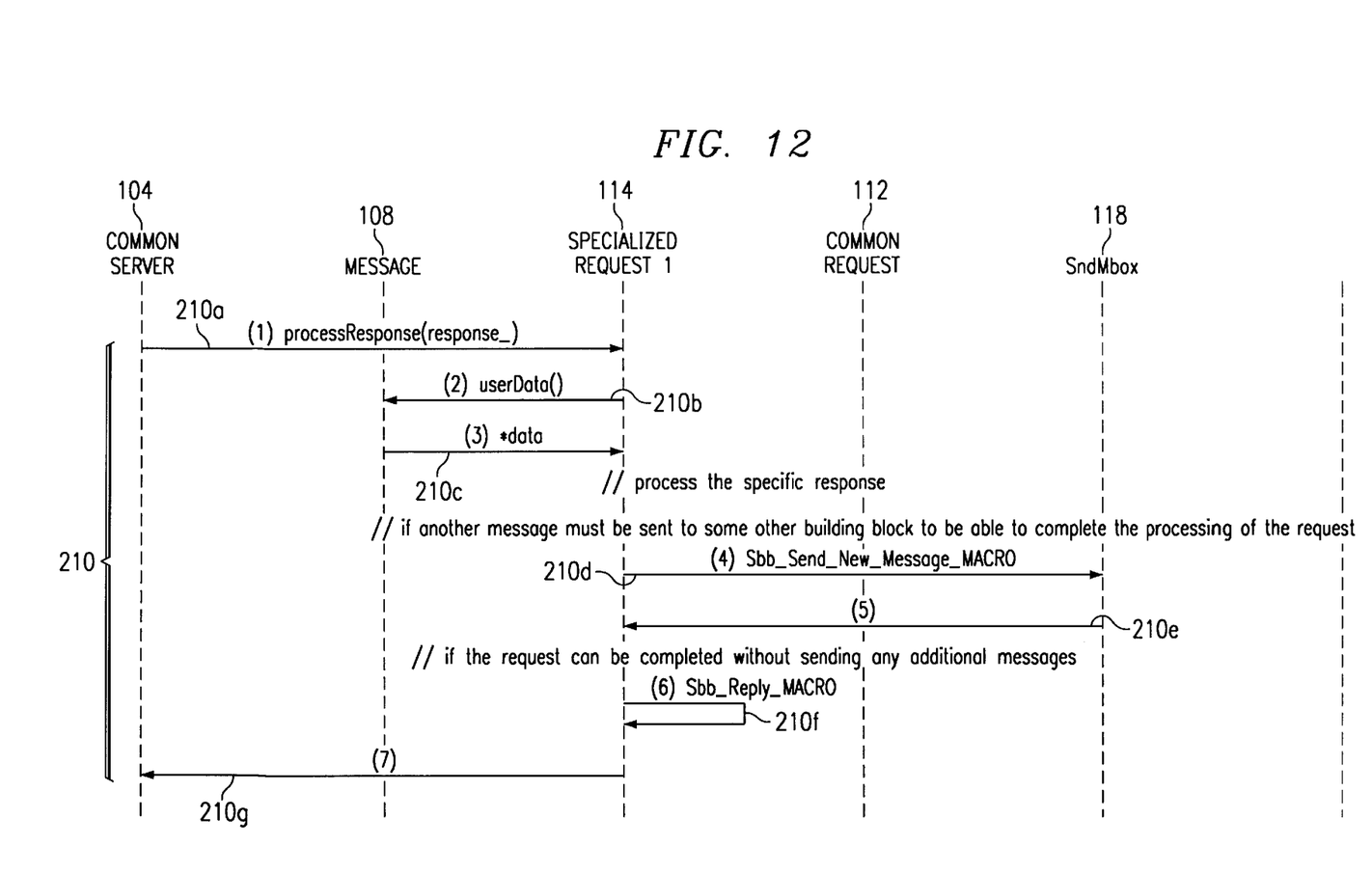
FIG. 12 is an event trace corresponding to a sequence for matching response messages received by a server object with the appropriate specialized request object according to the event trace of FIGS. 6A and 6B.

Referring again to FIG. 6B, if the message received by the common server object is not a request-type message but instead a response-type message, then the common server object finds the specialized request object on the common server object's active request list that is waiting for the message by matching the source sequence identifier with the sequence identifier of the response-type message (Event 1000m). The event sequence 210 as shown in FIG. 12 is executed for processing the response message (Events 100n and 100o). Processing control is then returned to the common server (Event 100o) and the minimum timeout for the currently active requests is recalculated (Event 100p). The recalculated value is used as the timeout for processing the next incoming message.

FIG. 7 shows the process timeout sequence 120 for adjusting the timeout period for a request. FIG. 7 corresponds to the processing steps shown by Events 100e and 100f of FIG. 6A. As shown by FIG. 7, adjustment of the timeout period is handled by a function within the common request class 112. For each of the active timers associated with the specialized request objects, a common request object uses the adjusted timeout period to decrement the individual timer values (Event 120a). If the timer for a specialized request object has expired, a call is made to that specific request object's timeout function to process the timeout (Event 120b). An event sequence 140 is then executed for replying to a request-type message (Event 120c), as shown in FIG. 8, and processing control is returned to the common request object from the specialized request object (Event 120d). Processing control is then returned back to the common server object from the common request object (Event 120e).

FIG. 9 is an event trace corresponding to an event sequence 160 for creating a new specialized request object as shown by Events 100i and 100j of FIG. 6A. FIG. 9 shows how a new specialized request object is created when a request-type message is received.

According to a preferred method of the present invention, the event sequence 160 as shown in FIG. 9 is used by the common server object to request that the specialized factory object construct a new request object that is responsible for processing the received message. The common server object first requests that the specialized factory object create the specialized request object (Event 160a). If the specialized factory object supports the operation type in the request-type message, then the appropriate specialized request object is constructed based on the operation type (Event 160b). The specialized request object then appends itself to the common server object's active request list (Event 160c) and processing control is returned to the newly created specialized request from the common server object (Event 160d). A pointer to the newly created request object is then returned to the specialized factory object from the newly created request object (Event 160e).

If the specialized factory object does not support the operation type in the request-type message, then the specialized factory object requests that its base class, the common factory object class 117, construct an "unknown" request object to process the unsupported request (Events 160f and 160g). The "unknown" request object then appends itself to the common server object's active request list (Event 160h) and processing control is returned to the newly created "unknown" request object from the common server object (Event 160i). A pointer to the newly created "unknown" request object is then returned to the specialized factory object (Event 160j). Regardless of whether or not the requested operation is supported by the specialized factory object, a pointer to a specialized request object or "unknown" request object is always returned to the common server object (Event 160k).

FIG. 10 shows an event trace of an initial processing event sequence 180 for initially processing a newly created request object. FIG. 10 corresponds to the processing steps shown by Events 100k and 100l of FIGS. 6A and 6B. According to a preferred embodiment of the present invention, the initial processing event sequence 180 of FIG. 10 is designed to process two scenarios: (1) where the requested operation can be completed within the initial processing stage and (2) where the request object must send a message to another building block and receive a response before completing processing of the requested operation.

Figure 11:
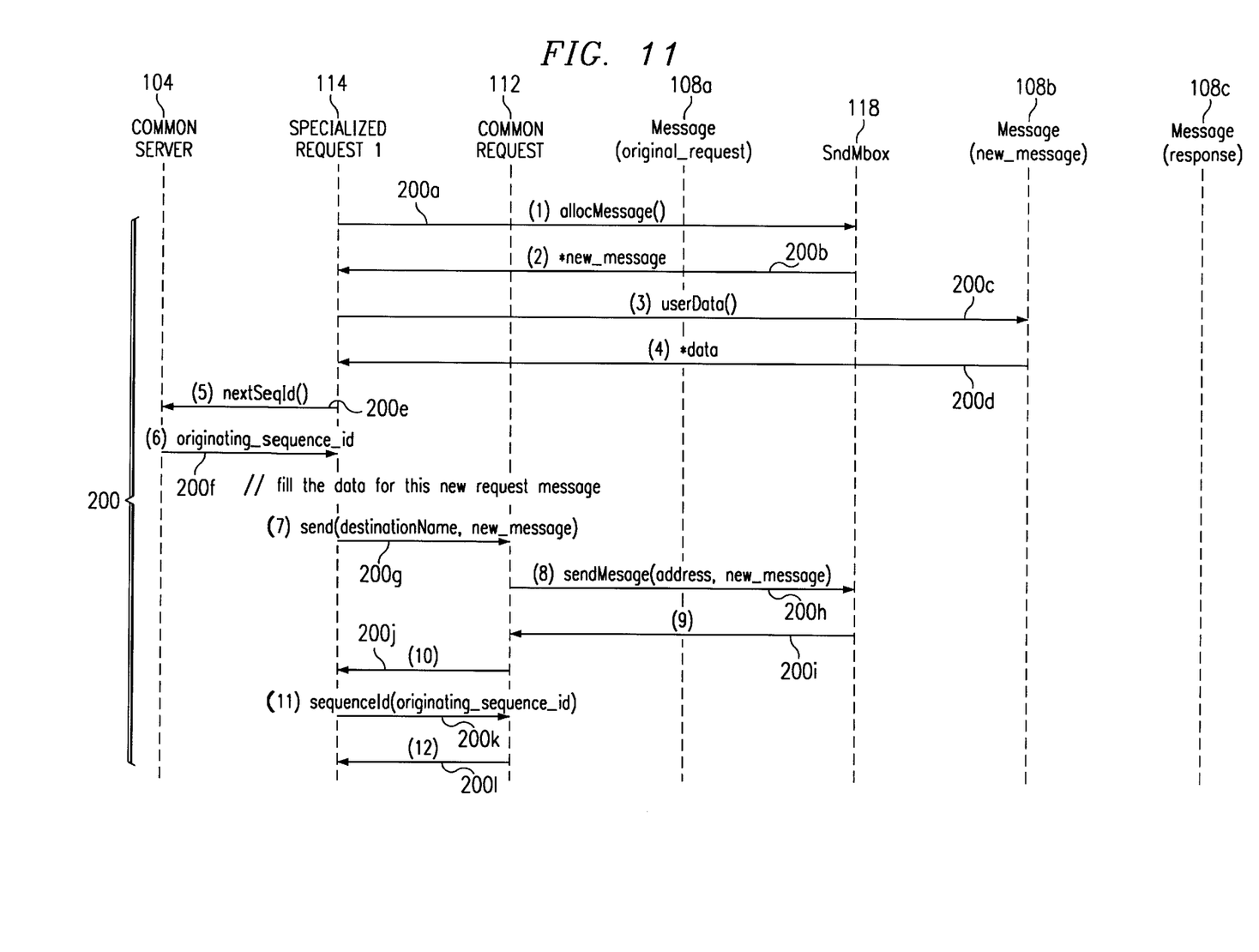
FIG. 11 is an event trace corresponding to a sequence used by a specialized request object for allocating and sending a new specialized request message to another building block according to the event trace of FIG. 10.

As further shown in FIG. 10, in the initial processing event sequence 180 for processing a newly created request object, the common server object begins processing of the requested operation by invoking the specialized request object's process request method (Event 180a). The specialized request object then requests a pointer from the "original request" message object to the message data of the original received request-type message (Event 180b), and the pointer is returned from the "original request" message object to the specialized request object (Event 180c). If the request needs to send a message to another server to complete the requested operation, an event sequence 200 is executed as shown in FIG. 11 for allocating and sending a new request message to another building block (Event 180d). Control is then returned back to the specialized request object (Event 180e).

If the request can complete the processing of the requested operation without sending messages to another server it does so. When the processing has been completed, the request sends a reply back to the sender of the request-type message by executing event sequence 140 as shown in FIG. 8 (Event 180f of FIG. 10). Regardless of whether a new message or a reply was sent, control is returned back to the common server object (Event 180g of FIG. 10).

Completion of the initial processing event sequence 180 of FIG. 10 therefore indicates that either the entire processing of the specialized request object is complete, i.e., the request was a simple request, or that at least one additional request-type message has been sent by the specialized request object to another building block and the original specialized request object is waiting for a response before continuing processing. A simple or trivial request can be, for example, a request to activate a display light on the control panel of a certain hardware component. In such a case, the sequence 180 activates the display light and then sends the reply back to the common server object that originally initiated the request.

In any event, whether a simple or complex request is involved, the sequence 180 always returns control back to the common server object such that the server processing loop of FIGS. 6A and 6B is resumed and the next message is processed. Therefore, after completion of the initial processing event sequence 180 of FIG. 10, processing control is returned to the common server object as shown by Event 1001 in FIG. 6B.

FIG. 12 shows an event trace of a event sequence 210 for processing response messages received by a common server object by the corresponding specialized request object. FIG. 12 corresponds to the processing steps shown by Events 100n and 100o of FIG. 6B.

As further shown in FIG. 12, the event sequence 210 for processing response messages includes a request by the common server object to some specialized request object to begin processing of the response-type message (Event 210a), and a request (Event 210b) and return of a pointer to the message data of the response-type message (Event 210c). If the request-type message requires that a new message be sent to another server to complete the requested operation, the event sequence 200 of FIG. 11 is executed for allocating and sending a new request-type message to the other server (Event 210d). The new request-type message is then created and sent to the send mailbox object class, and processing control is returned from the send mailbox object to the specialized request object (Event 210e). If the specialized request object can complete the requested operation without sending any additional request-type messages, then the event sequence 140 for replying to a request-type message shown in FIG. 8 is executed and processing control is returned back to the common server object (Event 210g).

After the sequence for processing the response-type message by the corresponding specialized request object is completed, (1) the entire processing of the original request-type message has completed or (2) a new request-type message has been sent to another building block. If a new request-type message has been sent to another building block, then the specialized request object is waiting for a response before it can continue processing and the event sequence 210 will be repeated for each response-type message the common server receives for this request.

FIG. 8 shows an event sequence 140 for replying to a request-type message used by the process timeout event sequence 120 of FIG. 7 (Events 120c and 120d of FIG. 7), the initial processing event sequence 180 of FIG. 10 (Events 180f and 180g of FIG. 10) and the process response event sequence 210 of FIG. 12 (Events 210f and 210g of FIG. 12). The event sequence 140 of FIG. 8 begins by invoking the reply method of the specialized request object (Event 140a), acquiring a pointer from the message object to the start of the message data within the original request message (Event 140b), and returning the pointer to the specialized request object from the message object (Event 140c). If the original request-type message requires a reply, the specialized request object "fills-in" the data required for the response message and invokes the common request object's reply method (Event 140d).

Next, the common request object sends the response message (Event 140d), sending the reply corresponding to original request-type message to the send mailbox object from the common request object (Events 140e and 140f), and returns processing control back to the specialized request (Event 140g). The completed specialized request object then deletes itself (Event 140h), calls a request object class destructor in the common request object class (Event 140i), which removes the "timed-out" or completed request object from the common server object's active request list (Event 140j), and returns processing control to the common request object from the common server object. If the original message did not require a reply then the original request message is deallocated from the send mailbox object (Event 140l), processing control is returned to common request object from the send mailbox object (Event 140m), and then to the removed specialized request object from common request object (Event 140n).

FIG. 11 shows an event trace of an event sequence 200 used by a request object for allocating and sending a new request-type message to another server. FIG. 11 corresponds to the processing steps shown by Events 180d and 180e of FIG. 10.

As shown in FIG. 11, the event sequence 200 for allocating and sending a new request-type message to another server begins with the specialized request object allocating a new message from the send mailbox object (Event 200a), and a pointer to the new message is returned to the specialized request object from the send mailbox object (Event 200b). The specialized request object then requests a pointer to the new message data from the "new message" message object (Event 200c), and the pointer is returned from the "new message" message object to the specialized request object (Event 200d). The specialized request object then requests a new sequence identifier from the common server object (Event 200e), which in turn assigns and returns to the specialized request object the new sequence identifier that is used to match up the specialized request object to corresponding response-type message (Event 200f).

After the new sequence identifier is returned to the specialized request object, the specialized request object fills in the data for the message. As shown in FIG. 11, the new request-type message, including the message data and destination information, is requested to be sent by the common request object (Event 200g). The common request object converts the destination name of the new request-type message into an addressable message recognizable by the messaging service, and the addressable message is then forwarded to the send mailbox object corresponding to the messaging service (Event 200h). The send mailbox sends the message and processing control is then returned to the common request object from the send mailbox object (Event 200i), and then to the specialized request object (Event 200j). Finally, the new sequence identifier is saved in the request object (Event 200k) and processing control is returned to the specialized request object (Event 200l).

Referring again to FIG. 6B, Events 100i through 100m always return with a pointer to a specialized request object of some sort even if a request message is not understood. For example, if the request message is not understood by the common factory object or if a matching specialized request object cannot be found for a response-type message, then this will be processed as an error condition. and an "unknown request" object will be returned to the common server object. The "unknown request" object will process these errors in its process request and process response methods thus relieving the common server object from processing these error conditions.

Although the present invention has been described in connection with particular embodiments thereof, it is to be understood that such embodiments are susceptible of modification and variation without departing from the inventive concept disclosed. All such modifications and variations, therefore, are intended to be included within the spirit and scope of the appended claims.

What is claimed is:

1. A distributed architecture computing system having one or more processors and an object-oriented control program for processing request-type messages associated with one or more newly requested operations and response-type messages associated with previously requested operations, said control program comprising:

a common server object for receiving and processing incoming messages, the common server object operable to determine whether a current incoming message is a request-type or response-type message, each request-type message including a sequence identifier unique to an originator of said request-type message, each response-type message including the sequence identifier of a corresponding request-type message;

a common factory object for receiving said request-type messages from said common server object and creating a specialized request object for each of said request-type messages, said specialized request object comprising process request and process response methods for performing said requested operations, maintaining state information associated with said requested operations and generating said response-type messages, said specialized request object performing specialized processing of an associated request-type message independent of the functionality of the common server object;

a common request object associated with said specialized request object comprising process request, process response, send and reply methods for processing unknown request-type and response-type messages and for generating said request-type and response-type messages;

a receive mailbox object associated with said common server object for accessing said request-type and response-type messages bound for said common server object;

a send mailbox object associated with said common factory object for sending said response-type messages to said receive mailbox object; and a message object for buffering message data included in said request-type and response-type messages;

wherein the common server object is operable to adjust timeout periods associated with all active request operations in response to delay while processing the current incoming message.

2. The distributed architecture computing system according to claim 1, wherein said common server object comprises an active request list for matching response-type messages with said previously requested operations.

3. The distributed architecture computing system according to claim 1, further comprising one or more specialized server objects for performing specific server tasks.

4. The distributed architecture computing system according to claim 1, further comprising one or more specialized factory objects for performing specific factory tasks.

5. The distributed architecture computing system according to claim 1, further comprising one or more specialized request objects for performing specific request tasks.

6. A distributed telecommunications switching system having one or more processors and an object-oriented control program for processing request-type messages associated with one or more newly requested operations and response-type messages associated with previously requested operations, said control program comprising:

a common server object for receiving and processing incoming messages, the common server object operable to determine whether a current incoming message is a request-type or response-type message, each request-type message including a sequence identifier unique to an originator of said request-type message, each response-type message including the sequence identifier of a corresponding request-type message;

a common factory object for receiving said request-type messages from said common server object and creating a specialized request object for each of said request-type messages, said specialized request object comprising process request and process response methods for performing said requested operations, maintaining state information associated with said requested operations and generating said response-type messages, said specialized request object performing specialized processing of an associated request-type message independent of the functionality of the common server object;

a common request object associated with said specialized request object comprising process request, process response, send and reply methods for processing unknown request-type and response-type messages and for generating said request-type and response-type messages;

a receive mailbox object associated with said common server object for accessing said request-type and response-type messages bound for said common server object;

a send mailbox object associated with said common factory object for sending said response-type messages to said receive mailbox object; and a message object for buffering message data included in said request-type and response-type messages;

wherein the common server object is operable to adjust timeout periods associated with all active request operations in response to delay while processing the current incoming message.

7. The distributed telecommunications switching system according to claim 1, wherein said common server object comprises an active request list for matching response-type messages with said previously requested operations.

8. The distributed telecommunications switching system according to claim 1, further comprising one or more specialized server objects for performing specific server tasks.

9. The distributed telecommunications switching system according to claim 1, further comprising one or more specialized factory objects for performing specific factory tasks.

10. The distributed telecommunications switching system according to claim 1, further comprising one or more specialized request objects for performing specific request tasks.

11. In a method of processing messages in a distributed architecture computing system, wherein request-type messages are provided to a common server object for processing, the improvement comprising:

creating specialized request objects using a specialized factory object in response to said request-type messages, said specialized request objects including process request and process response methods for processing said request-type messages;

invoking said process request and process response methods using said common server object for processing said request-type messages and response-type messages associated with request-type messages, said specialized request object performing specialized processing of an associated request-type message independent of the functionality of the common server object, each request-type message including a sequence identifier unique to an originator of said request-type message, each response-type message including the sequence identifier of a corresponding request-type message;

adjusting timeout periods associated with the specialized request objects in response to delay while processing a most recent request-type or response-type message.

12. The improvement specified in claim 11, wherein said common server object maintains a record of said specialized request objects and correlates said response-type messages with said specialized request objects.

13. The improvement specified in claim 11, wherein said distributed architecture computing system further comprises one or more specialized server objects for performing specific server tasks, and wherein said common server, common factory and common request objects process all aspects of sending and receiving said request-type messages and response-type messages, and maintaining an active request list for matching said response-type messages with said corresponding request-type messages for any number of specialized servers regardless of the processing required of the specialized servers.

14. In a method of processing messages in a distributed telecommunications switching system, wherein request-type messages are provided to a common server object for processing, the improvement comprising:

creating specialized request objects using a specialized factory object in response to said request-type messages, said specialized request objects including process request and process response methods for processing said request-type messages;

invoking said process request and process response methods using said common server object for processing said request-type messages and response-type messages associated with request-type messages, said specialized request object performing specialized processing of an associated request-type message independent of the functionality of the common server object, each request-type message including a sequence identifier unique to an originator of said request-type message, each response-type message including the sequence identifier of a corresponding request-type message;

adjusting timeout periods associated with the specialized request objects in response to delay while processing a most recent request-type or response-type message.

15. The improvement specified in claim 14, wherein said common server object maintains a record of said specialized request objects and correlates said response-type messages with said specialized request objects.

16. The improvement specified in claim 14, wherein said distributed telecommunications switching system further comprises one or more specialized server objects for performing specific server tasks, and wherein said common server, common factory and common request objects process all aspects of sending and receiving said request-type messages and response-type messages, and maintaining an active request list for matching said response-type messages with said corresponding request-type messages for any number of specialized servers regardless of the processing required of the specialized servers.

* * * * *